US011810466B2

(12) United States Patent
Masumoto

(10) Patent No.: US 11,810,466 B2
(45) Date of Patent: Nov. 7, 2023

(54) AIRSPACE USAGE PROMOTION SYSTEM, AIRSPACE USAGE PROMOTION METHOD, SERVER DEVICE, AND PROGRAM

(71) Applicant: TRUEBIZON, LTD., Fukuoka (JP)

(72) Inventor: Mamoru Masumoto, Fukuoka (JP)

(73) Assignee: TRUEBIZON, LTD., Fukuoka (JP)

( * ) Notice: Subject to any disclaimer, the term of this patent is extended or adjusted under 35 U.S.C. 154(b) by 560 days.

(21) Appl. No.: 16/981,624

(22) PCT Filed: Mar. 18, 2019

(86) PCT No.: PCT/JP2019/011234
§ 371 (c)(1),
(2) Date: Oct. 14, 2020

(87) PCT Pub. No.: WO2019/181867
PCT Pub. Date: Sep. 26, 2019

(65) Prior Publication Data
US 2021/0089056 A1 Mar. 25, 2021

(30) Foreign Application Priority Data
Mar. 22, 2018 (JP) .................. 2018-055389

(51) Int. Cl.
*G08G 5/00* (2006.01)
*B64C 39/02* (2023.01)
(Continued)

(52) U.S. Cl.
CPC ......... *G08G 5/0069* (2013.01); *B64C 39/024* (2013.01); *G05D 1/101* (2013.01); *G06F 9/466* (2013.01); *B64U 2101/30* (2023.01)

(58) Field of Classification Search
CPC .. G08G 5/0069; G08G 5/0021; G08G 5/0026; G08G 5/0034; G08G 5/0013;
(Continued)

(56) References Cited

U.S. PATENT DOCUMENTS

| 2013/0132438 A1 | 5/2013 | Park et al. |
| 2016/0232627 A1 | 8/2016 | Smith et al. |
| 2017/0278409 A1* | 9/2017 | Johnson ............... G08G 5/0069 |

FOREIGN PATENT DOCUMENTS

| CN | 103226560 A | 7/2013 |
| CN | 107683492 A | 2/2018 |

(Continued)

OTHER PUBLICATIONS

English translation of DE-4237530-A1 (Year: 1994).*
(Continued)

*Primary Examiner* — Shon G Foley
(74) *Attorney, Agent, or Firm* — United IP Counselors, LLC

(57) ABSTRACT

A server device of the present invention is capable of establishing communication with an information terminal and issues a domain that specifies an airspace and is formed of at least first to third domain information. The server device includes: an entry processing unit configured to process a domain issuance request from the information terminal; and a domain issuance unit that issues a sky domain in response to the issuance request. The information terminal transmits at least area information and third domain information. The domain issuance unit issues a sky domain indicative of an airspace in which the first domain information is a predetermined character string, the second domain information is a character string corresponding to the area information, and the third domain information is a character string transmitted from the information terminal.

9 Claims, 24 Drawing Sheets

(51) Int. Cl.
    *G05D 1/10*       (2006.01)
    *G06F 9/46*       (2006.01)
    *B64U 101/30*     (2023.01)

(58) Field of Classification Search
    CPC ...... G08G 5/006; B64C 39/024; G05D 1/101;
              G06F 9/466; B64U 2101/30; G06Q
              30/06; G06Q 50/10
    See application file for complete search history.

(56) References Cited

FOREIGN PATENT DOCUMENTS

| DE | 4237530 A1 * | 5/1994 | ........... G08G 5/0013 |
|---|---|---|---|
| EP | 2620881 A2 | 7/2013 | |
| EP | 3257018 A1 | 12/2017 | |
| JP | 2003-522990 A | 7/2003 | |
| JP | 2013-156991 A | 8/2013 | |
| JP | 2018-508919 A | 3/2018 | |
| KR | 10-2017-0139506 A | 12/2017 | |
| WO | 2016/130755 A1 | 8/2016 | |

OTHER PUBLICATIONS

English translation of International Search Report dated Jun. 18, 2019 in PCT/JP2019/011234.
Office Action dated Jan. 8, 2019 in Japanese Patent Application No. 2018-055389 whose priority is claimed in PCT/JP2019/011234.
JUIDA to jointly develop Japan's first drone-only flight support map service with Zenrin and Blue Innovation (a machine English translation), published on Sep. 28, 2015, Japan.

* cited by examiner

FIG. 3 space1 : example : fo : sky
FOURTH S DOMAIN  THIRD S DOMAIN  SECOND S DOMAIN  TOP S DOMAIN
(SUB-DOMAIN)                     (AREA LEVEL)

FIG. 6A

| LAND ID | NAME | PREFECTURE | LATITUDE | LONGITUDE | ALTITUDE | OPERATIONAL HOURS | LICENSE INFORMATION | PRICE | SKY DOMAIN ID | ADDITIONAL INFORMATION |
|---|---|---|---|---|---|---|---|---|---|---|
| *** | *** | *** | *** | *** | *** | *** | *** | *** | *** | *** |
| *** | *** | *** | *** | *** | *** | *** | *** | *** | *** | *** |

FIG. 6B

| SKY POLYGON ID | SKY DOMAIN ID | LATITUDE | LONGITUDE | ALTITUDE |
|---|---|---|---|---|
| *** | *** | *** | *** | *** |
| *** | *** | *** | *** | *** |

FIG. 6C

| SKY DOMAIN ID | USER ID | POSTAL CODE | PREFECTURE | POSTAL ADDRESS | LATITUDE | LONGITUDE | ALTITUDE | LAND TYPE | AREA MEASUREMENT | PUBLIC/PRIVATE | SKY DOMAIN |
|---|---|---|---|---|---|---|---|---|---|---|---|
| *** | *** | *** | *** | *** | *** | *** | *** | *** | *** | *** | *** |
| *** | *** | *** | *** | *** | *** | *** | *** | *** | *** | *** | *** |

FIG. 6D

| SUB DOMAIN ID | SKY DOMAIN ID | AREA INFORMATION |
|---|---|---|
| *** | *** | *** |
| *** | *** | *** |

FIG. 6E

| ID | PASSWORD | ATTRIBUTE INFORMATION | FLIGHT HISTORY | LICENSE INFORMATION |
|---|---|---|---|---|
| *** | *** | *** | *** | *** |
| *** | *** | *** | *** | *** |

REGISTER YOUR SKY!

TO GET THINGS STARTED, LET US KNOW YOUR POSTAL ADDRESS.

POSTAL CODE (WITHOUT HYPHEN)

8100041

PREFECTURE        CITY

FUKUOKA-PREF.     CHUO-KU, FUKUOKA-SHI

STREET NUMBER

NEXT

REGISTER YOUR SKY!

IS YOUR SKY (THAT IS, LAND) WIDER THAN 300 TSUBO?

300 TSUBO IS APPROXIMATELY 1,000 m².

○ WIDER THAN 300 TSUBO   ○ SMALLER THAN 300 TSUBO

NEXT

RETURN

FIG. 17

AIRSPACE USAGE PROMOTION SYSTEM, AIRSPACE USAGE PROMOTION METHOD, SERVER DEVICE, AND PROGRAM

CROSS-REFERENCE TO RELATED APPLICATIONS

This application is a National Stage Entry application of PCT International Application No. PCT/JP2019/011234, filed on Mar. 18, 2019, which claims the priority benefit of Japanese Patent Application No. 2018-055389, filed on Mar. 22, 2018, the entire contents of both of which are hereby incorporated by reference.

BACKGROUND

1. Technical Field

The present invention relates to a technique of matching airspace registrants such as landowners and airspace users thereby facilitating airspace utilization.

2. Description of the Background

Conventionally, unmanned aerial vehicles including drones are used in a wider range and becoming more widespread such as in the distribution industry. In addition to such a distribution purpose, drones which are now affordable for home users are increasingly actively used for aerial photography and other purposes.

In general, a landowner holds rights also as to the airspace above the land of his/her property by a prescribed height range. Accordingly, in planning a flight of a drone, the flight must be permitted by the landowner on principle.

In view of a future increase in the number of drones flying through an airspace, ever-more rigorous management of each airspace will be needed for flight safety.

Here, as to the airspace management, for example, Japanese Patent Republication No. 2003-522990 (hereinafter referred to as "Patent Literature 1") discloses a midair collision avoidance system in which, in the tactical mode, an airspace around an aircraft is divided into an advisory, a caution, and a warning air space equally distributed in three-dimensional space and time. The air traffic management module includes a tactical collision avoidance process which is activated when an intruder aircraft is crossing the boundary of the caution airspace. The process continues to be activated when an intruder aircraft is penetrating into the warning airspace.

BRIEF SUMMARY

The disclosure of Patent Literature 1 focuses on midair collision avoidance. It is silent about providing a domain to an airspace or realizing a transaction relating to any airspace utilization through the domain.

The present invention has been made in view of such a problem, and an object thereof is to match airspace registrants and airspace users thereby facilitating airspace utilization and improving flight safety.

In order to solve the problem, a server device according to a first aspect of the present invention is a server device capable of establishing communication with an information terminal and configured to issue a sky domain that specifies an airspace and is formed of at least first to third domain information, the server device including: an entry processing unit configured to process a sky domain issuance request from the information terminal; a domain issuance unit configured to issue a sky domain in response to the issuance request; a memory configured to store at least the sky domain, latitude, longitude, and altitude of a representative point, and operational hours; a search unit configured to conduct a search using the sky domain as a search key with reference to the memory in response to a search request from the information terminal, the search request relating to the airspace with which the sky domain has been issued; a transaction processing unit configured to process a transaction relating to airspace utilization through the sky domain with reference to the memory in response to a use request from the information terminal, the use request relating to the airspace with which the sky domain has been issued; and a transmission processing unit configured to transmit a result of the search. The domain issuance unit issues the sky domain in which the first domain information is a top sky domain formed of a predetermined character string, the second domain information is a second sky domain formed of a character string corresponding to area information that is specified according to area information of an airspace right holder, and the third domain information is a third sky domain formed of a character string transmitted from the information terminal of the airspace right holder who is an applicant. The search unit conducts a search according to the information stored in the memory, the transmission processing unit transmits a result of the search to the information terminal, the transaction processing unit processes a transaction according to the latitude, longitude, altitude of the representative point and the operational hours stored in the memory.

The airspace utilization facilitation system according to a second aspect of the present invention is an airspace utilization facilitation system including: an information terminal; and a server device capable of establishing communication with the information terminal and configured to issue a sky domain that specifies an airspace and is formed of at least first to third domain information, the server device including: an entry processing unit configured to process a sky domain issuance request from the information terminal; a domain issuance unit configured to issue a sky domain in response to the issuance request; a memory configured to store at least the sky domain, latitude, longitude, and altitude of a representative point, and operational hours; a search unit configured to conduct a search using the sky domain as a search key with reference to the memory in response to a search request from the information terminal, the search request relating to the airspace with which the sky domain has been issued; a transaction processing unit configured to process a transaction relating to airspace utilization through the sky domain with reference to the memory in response to a use request from the information terminal, the use request relating to the airspace with which the sky domain has been issued; and a transmission processing unit configured to transmit a result of the search. The domain issuance unit issues the sky domain in which the first domain information is a top sky domain formed of a predetermined character string, the second domain information is a second sky domain formed of a character string corresponding to area information that is specified according to area information of an airspace right holder, and the third domain information is a third sky domain formed of a character string transmitted from the information terminal of the airspace right holder who is an applicant. The search unit conducts a search according to the information stored in the memory, the transmission processing unit transmits a result of the search to the information terminal, the transaction processing unit processes a transaction according to the latitude, longitude, altitude of the representative point and the operational hours stored in the memory.

A program according to a third aspect of the present invention is configured to issue a domain that specifies an airspace and is formed of at least first to third domain information, the program causing a computer to function as:

an entry processing unit configured to process a sky domain issuance request from the information terminal;

a domain issuance unit configured to issue a sky domain in response to the issuance request;

a search unit configured to conduct a search using the sky domain as a search key with reference to a memory in response to a search request from the information terminal, the search request relating to the airspace with which the sky domain has been issued;

a transaction processing unit configured to process a transaction relating to airspace utilization through the sky domain with reference to the memory in response to a use request from the information terminal, the use request relating to the airspace with which the sky domain has been issued; and a transmission processing unit configured to transmit a result of the search, wherein the domain issuance unit issues the sky domain in which the first domain information is a top sky domain formed of a predetermined character string, the second domain information is a second sky domain formed of a character string corresponding to area information that is specified according to area information of an airspace right holder, and the third domain information is a third sky domain formed of a character string transmitted from the information terminal of the airspace right holder who is an applicant, and the search unit conducts a search according to the information stored in the memory, the transmission processing unit transmits a result of the search to the information terminal, the transaction processing unit processes a transaction according to the latitude, longitude, altitude of the representative point and the operational hours stored in the memory.

An airspace utilization facilitation method according to a fourth aspect of the present invention is an airspace utilization facilitation method performed by an airspace utilization facilitation system including an information terminal and a server device capable of establishing communication with the information terminal and configured to issue a sky domain that specifies an airspace and is formed of at least first to third domain information, the method including: in the server device, processing, by an entry processing unit, a sky domain issuance request from the information terminal; issuing, by a domain issuance unit, a sky domain in response to the issuance request; storing, by a memory, at least the sky domain; conducting a search, by a search unit, using the sky domain as a search key with reference to the memory in response to a search request from the information terminal, the search request relating to the airspace with which the sky domain has been issued; processing, by a transaction processing unit, a transaction relating to airspace utilization through the sky domain with reference to the memory in response to a use request from the information terminal, the use request relating to the airspace with which the sky domain has been issued; and transmitting, by a transmission processing unit, a result of the search. The domain issuance unit issues the sky domain in which the first domain information is a top sky domain formed of a predetermined character string, the second domain information is a second sky domain formed of a character string corresponding to area information that is specified according to area information of an airspace right holder, and the third domain information is a third sky domain formed of a character string transmitted from the information terminal of the airspace right holder who is an applicant. The search unit conducts a search according to the information stored in the memory, the transmission processing unit transmits a result of the search to the information terminal, the transaction processing unit processes a transaction according to the latitude, longitude, altitude of the representative point and the operational hours stored in the memory.

The present invention provides an airspace utilization facilitation system, an airspace utilization facilitation method, a server device, and a program which match airspace registrants and airspace users thereby facilitating airspace utilization and improving flight safety.

BRIEF DESCRIPTION OF DRAWINGS

FIG. 3 indicates the configuration of a sky domain.

FIG. 6 is various kinds of tables.

FIG. 9 illustrates a registration window.
FIG. 10 illustrates a registration window.
FIG. 12 illustrates a registration window.
FIG. 13 illustrates a registration window.

FIG. 17 illustrates a search window.

DETAILED DESCRIPTION

In the following, with reference to the drawings, a description will be given of one embodiment of the present invention.

An airspace utilization facilitation system according to one embodiment of the present invention provides a system and others of providing a sky domain to an airspace. This realizes matching between users who are airspace registrants such as landowners, that is, airspace right holders, and users who are airspace users, thereby facilitating airspace utilization and airspace transactions.

To this end, "a sky address (address)" and a name (sky domain) are given to arbitrary unit of three-dimensional space (latitude, longitude, and altitude) (hereinafter referred to as an airspace). Thus, the spatial position is clearly specified, to facilitate sales of airspace-use rights, lease of airspace, delivery point locating, spatial characteristic evaluation and the like. A detailed description will be given in the following.

Figure 1:
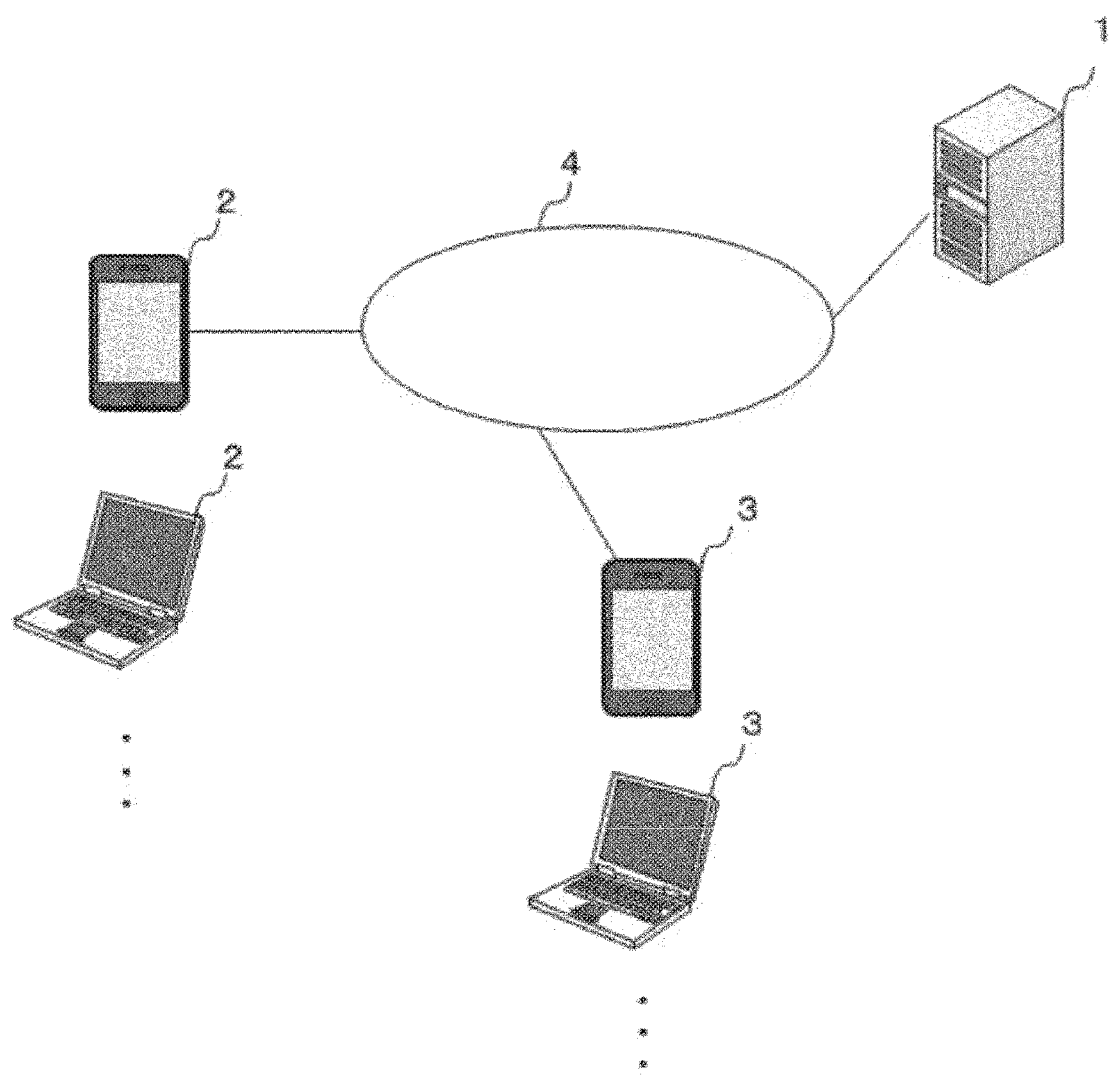
FIG. 1 is a configuration illustration of an airspace utilization facilitation system according to one embodiment of the present invention.

FIG. 1 illustrates the configuration of the airspace utilization facilitation system according to one embodiment of the present invention.

As illustrated in FIG. 1, the system includes: a server device 1 of a service provider which provides service relating to airspace utilization facilitation; an information terminal 2 of a user who is the airspace registrant such as an airspace right holder, and an information terminal 3 of a user who is the airspace user, which are communicably connected to one another through a network such as the internet.

In this configuration, the airspace right holder or the like inputs various kinds of information using the information terminal 2 on a registration window of the website provided by the server device 1, to register the airspace above the land he/she owns. In registering, the user can request issuance of a sky domain that specifies the airspace. When the server device 1 receives a request relating to registration of the airspace and issuance of a sky domain from the information terminal 2 of the airspace right holder or the like, the server device 1 issues a sky domain and registers the sky domain on a database in association with the latitude, longitude, and altitude specifying the airspace.

On the other hand, using the information terminal 3 and on the search window of the website provided by the server device 1, the airspace user can search for a desired airspace and make a request relating to use. When the server device 1 receives the request relating to use of any airspace from the information terminal 3, the server device 1 registers on the database the information relating to the use. When the use application is made, the airspace user is charged to a prescribed usage fee by electronic payment. The amount obtained by subtracting a commission charge from the usage fee is payed to the registered airspace right holder of the utilized airspace by electronic payment. Note that, the scheme is merely an example and not limited thereto. Thus, the present system realizes a platform that facilitates matching between the airspace right holder or the like and the user.

Figure 2:
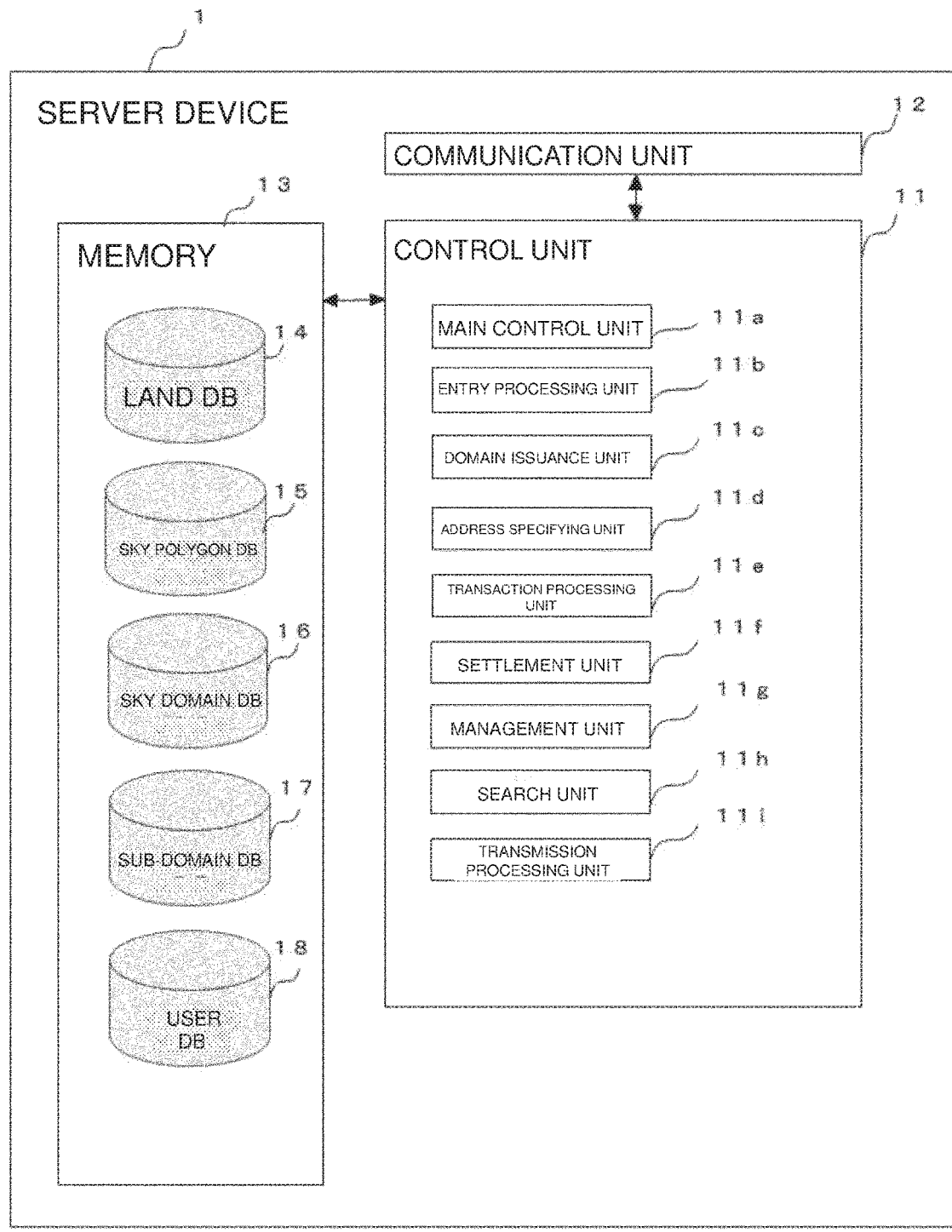
FIG. 2 is a configuration illustration of a server device in the system.

FIG. 2 illustrates in detail the configuration of the server device in the airspace utilization facilitation system according to one embodiment of the present invention. The server device 1 is capable of communicating with the information terminals 2, 3 and for example issues a domain formed of first to fourth domain information which specifies an airspace.

As illustrated in FIG. 2, the server device 1 includes a control unit 11 which exerts control over the entire server device 1, such as a CPU (Central Processing Unit) or an MPU (Micro Processing Unit). The control unit 11 is connected to a communication unit 12 and a memory 13. The communication unit 12 is a communication interface for establishing communication with the users' information terminals 2, 3 via a network 4.

The memory 13 is realized by a RAM (Random Access Memory), a ROM (Read Only Memory), a hard disk drive (Hard Disc Drive) or the like, and stores a program executed by the control unit 11. The memory 13 provides the work area in executing the program. Furthermore, the memory 13 stores a land DB 14, a sky polygon DB 15, a sky domain DB 16, a sub domain DB 17, and a user DB 18.

In such a configuration, by the control unit 11 executing the program in the memory 13, the control unit 11 functions as a main control unit 11a, an entry processing unit 11b, a domain issuance unit 11c, an address specifying unit 11d, a transaction processing unit 11e, a settlement unit 11f, a management unit 11g, a search unit 11h, and a transmission processing unit 11i.

The main control unit 11a exerts general control. The entry processing unit 11b processes a domain issuance request and others from the information terminal 2. In response to a domain issuance request, the domain issuance unit 11c issues a domain. In more detail, when at least area information and third and fourth domain information are transmitted from the information terminal 2, the domain issuance unit 11c issues a sky domain in which: the first domain information is a predetermined character string; the second domain information is a character string corresponding to the area information; the third domain information and the fourth domain information are each a character string transmitted from the information terminal.

The issued sky domain is provided with a sky domain ID. In association with the sky domain ID, airspace information is stored in the memory 13. For example, when certain airspace is to be specified by a tubular sub-domain which will be described later, the airspace information consisting of four sets of latitudes, longitudes, and altitudes specifying the entrance of the airspace and four sets of latitudes, longitudes, and altitudes specifying the exit of the airspace is stored in the memory 13. The address specifying unit 11d specifies the sky address.

The transaction processing unit 11e processes transactions relating to the airspace utilization through any sky domain. More specifically, when the transaction processing unit 11e receives a use request for an airspace specified by a sky domain from the information terminal 3, the transaction processing unit 11e processes the transaction relating to the use. Any information on the processed transaction is stored in the memory 13. When the transaction process is done, the settlement unit 11f executes electronic payment. The management unit 11g updates the content of the DBs 14 to 18 of the memory 13 upon issuance of a sky domain or execution of any transaction process.

When the search unit 11h receives a search request for any airspace from the information terminal 3, the search unit 11h executes a search using the sky domain as a search key. The transmission processing unit 11i transmits HTML data and others relating to the windows to the information terminals 2, 3 and others.

Here, with reference to FIG. 3, a description will be given of the configuration of the sky domain issued by the domain issuance unit 11c. As illustrated in FIG. 3, a sky domain consists of: a top sky domain as the first domain information; a second sky domain (area level) as the second domain information; a third sky domain as the third sky domain information; and a fourth sky domain (sub-domain) as the fourth sky domain information.

Each portion separated by colons (:) is referred as a label. In this example, the length of one label can be defined by 63 or less characters including lowercase alphabets a-z, numerical numbers 0-9, and a hyphen. Uppercase letters and lowercase letters are not distinguished from each other and regarded to be identical. Those portions where colons are placed are referred to as a plurality of dots (dots; Dots).

For example, while the top sky domain in Japan is basically "sky", there are other reserved domains such as "air", "sora", or "space". It is defined that the second sky domain is the abbreviation of prefectures (for example, tk for Tokyo, fo for Fukuoka), and the domain issuance unit 11c specifies the sky domain on the basis of the area information of the user who is the airspace right holder or the like.

An applicant such as a landowner or a naming right holder can set (acquire) any third sky domain. With a top-level domain without the second sky domain, the applicant can set (acquire) any second sky domain. This corresponds to .com or .net in DNS of the internet. The fourth sky domain is also referred to as a sub-domain and the owner of the third sky domain can determine any fourth sky domain.

Figure 4:
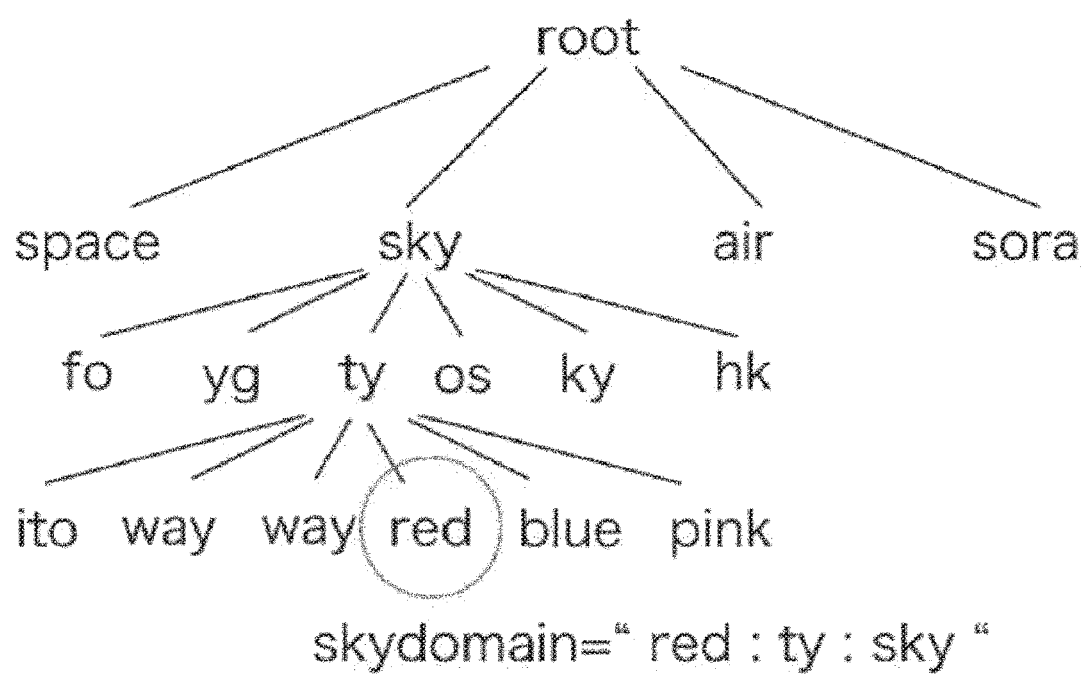
FIG. 4 indicates the configuration of a sky domain.

For the sake of convenience, FIG. 3 illustrates the example in which the server device 1 functions as a main server device and an SDNS server device. When the server device 1 is physically divided into the main server device and the SDNS (Sky Domain Name Server) server device, the main server device may manage the SDNS server device as to the management and operation of the sky domain, and the SDNS server device may manage the correspondence between the sky domain name and the sky address and the data of the sub-domain, as in the system in FIG. 4.

As to the airspace information registered in association with the sky domain, the user is prompted to place at least three arbitrary points so as to surround the land of his/her property on the map on the window of the user's information terminal 2. Then, in the server device 1, the address specifying unit 11d forms a land area and generates a polygon according to the information of the plotting points. The address specifying unit 11d elevates the land area by a predetermined height (in the present example, 300 m) to define a three-dimensional airspace, and associates the sky domain with this airspace (property space). To the airspace, additional information such as the environment (air current (wind velocity, direction), rainfall, temperature, radio waves, obstruction invasion risks and the like) or operational hours can be added.

Furthermore, in the airspace of the sky domain, any sub-domain can be set. For example, space up to a specified height or a three-dimensional body "tube" representing the usable range in detail may be created. The regions of the sub-domains may or may not overlap with each other. Unless they are totally identical space units (three-dimensional polygon groups), they may overlap with each other. However, depending on the purpose of use, their simultaneous use is prohibited.

Figure 5:
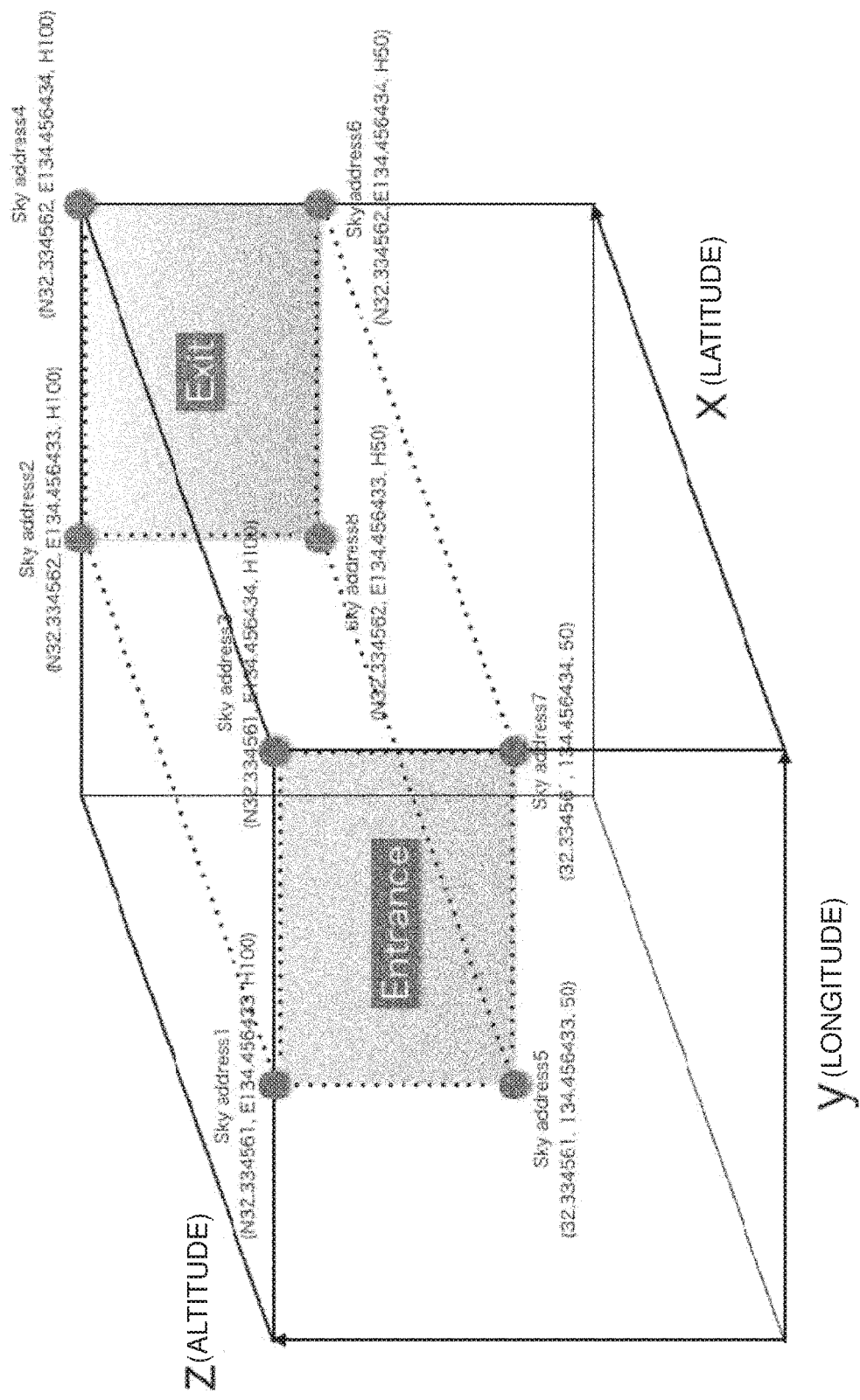
FIG. 5 is a conceptual illustration relating to specifying an airspace.

As to the database configuration of the tube, for example, as illustrated in FIG. 5, the tube is the space surrounded by lines connecting straight between an entrance plane (four-point entrance sky address) and an exit plane (four-point exit sky address) to the airspace. While an airspace shape of a curved surface or a sphere is not defined here, it may be added as necessary. Note that, specifying the airspace using the tube is also executed by the address specifying unit 11d.

Here, with reference to FIG. 6, a description will be given of the configuration of various databases.

FIG. 6A is a land table of the land DB 14. In the land table, a land ID is the primary key. In association with the land ID, the name of the land, the prefectural location, the latitude, longitude, and altitude of the representative point, the operational hours, the license information, the price (charge/selling price), the sky domain ID, and additional information (such as environment information) are stored.

FIG. 6B is a sky polygon table of the sky polygon DB 14. In the sky polygon table, a sky polygon ID is the primary key. In association with the sky polygon ID, a sky domain ID and the latitude, longitude, and altitude of the representative point are stored.

FIG. 6C is a sky domain table of the sky domain DB 14. In the sky domain table, a sky domain ID is the primary key. In association with the sky domain ID, a user ID, a zip code, a prefecture, a postal address, the latitude, longitude, and altitude of the representative point, a land type, area measurements, whether the information is public or private, and a sky domain are stored. The sky domain consists of: a top sky domain as the first domain information; a second sky domain (area level) as the second domain information; a third sky domain as the third sky domain information; and a fourth sky domain (sub-domain) as the fourth sky domain information.

FIG. 6D is a sub-domain table of the sub domain DB 14. In the sub-domain table, a sub-domain ID is the primary key. In association with the sub-domain ID, a sky domain ID and area information are stored. In more detail, as the area information, in order to specify the airspace by the above-described tube, the information (the latitude, longitude, and altitude) of the entrance plane (the four-point entrance sky address) and the exit plane (the four-point exit sky address) of the airspace is stored.

FIG. 6E is a user table of the user DB 14. In the user table, a user ID is the primary key. In association with the user ID, an authorization password, user attribute information, history information (flight hours, flight areas or the like), and license information are stored. The registered user attribute information may be, for example, mail address, name, postal address, sex, telephone number, date of birth or the like.

Next, with reference to FIG. 7, a description will be given of the configuration of the information terminal 2 in the airspace utilization facilitation system according to one embodiment of the present invention. Note that, the information terminal 3 is identically configured. Accordingly, a detailed description will be given exemplary of the configuration of the information terminal 2.

Figure 7:
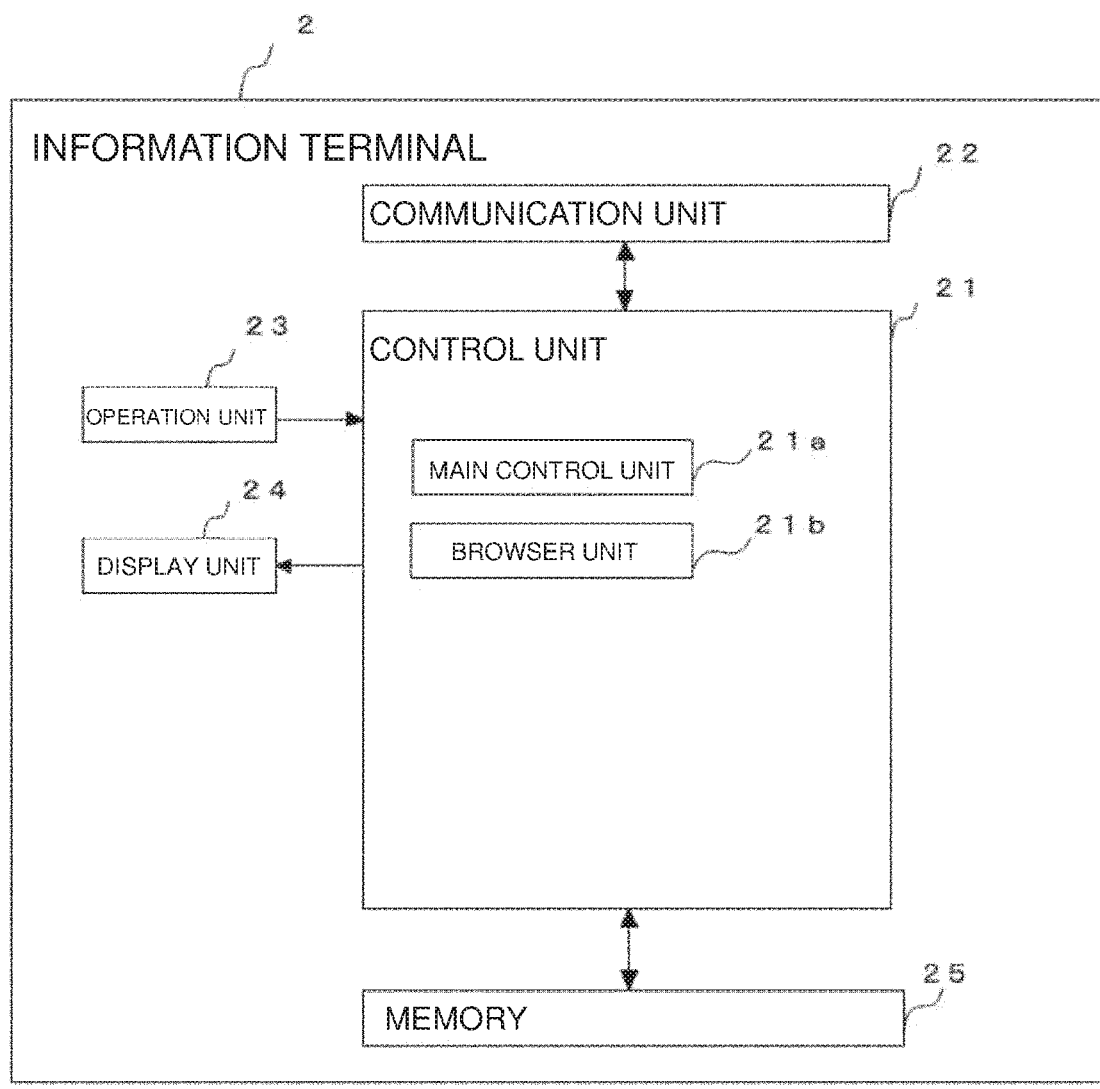
FIG. 7 is a configuration illustration of an information terminal in the airspace utilization facilitation system.

As illustrated in FIG. 7, the information terminal 2 includes a control unit 21 such as a CPU or an MPU which exerts control over the entire information terminal 2. The control unit 21 is connected to a communication unit 22, an operation unit 23, a display unit 24, and a memory 25 via a not-shown bus. The communication unit 22 is a communication I/F for establishing communication with the server device 1 and others via the network 4. The operation unit 23 is an operational device such as a mouse or a keyboard. The display unit 24 is a display device such as a liquid crystal display. The operation unit 23 and the display unit 24 may be integrated as a touchscreen. The memory 25 includes memory such as RAM or ROM as an HDD and stores a program executed by the control unit 21. The memory 25 provides the work area in executing the program.

In such a configuration, by exerting the program in the memory 25, the control unit 21 functions as a main control unit 21a and a browser unit 21b. The main control unit 21a exerts general control, such as data transmission/reception to/from the server device 1. The browser unit 21b exerts the browser function and realizes browsing according to HTML files transmitted from the server device 1.

In the following, with reference to the flowchart of FIG. 8, a detailed description will be given of the procedure of issuing a sky domain in the airspace utilization facilitation system according to one embodiment of the present invention. Here, the description thereof will be given with reference to the exemplary window displays in FIGS. 9 to 15 as appropriate.

Figure 9:
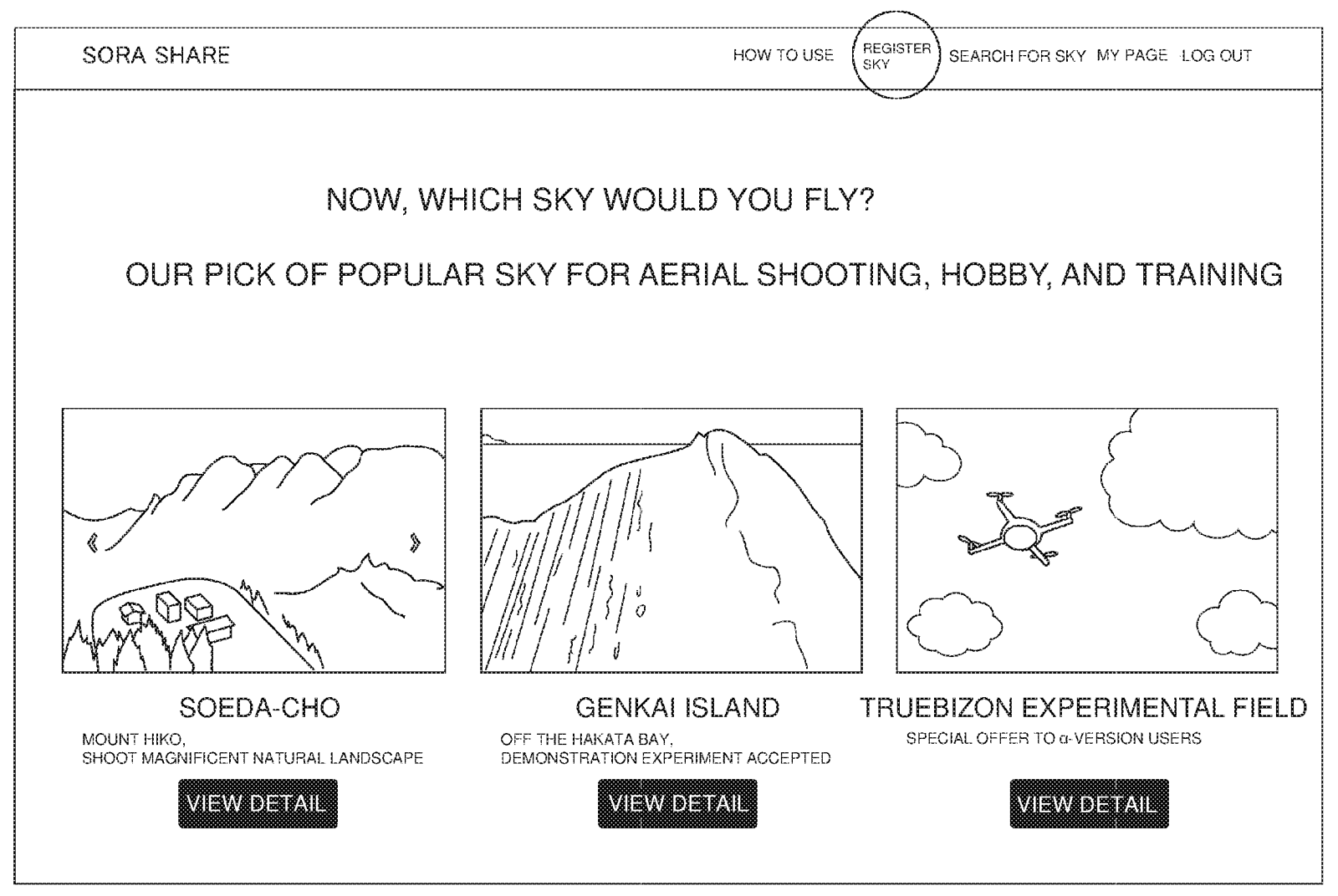

On the information terminal 2 of the user such as an airspace right holder, when a "Register sky" button is selected on the window in FIG. 9, under control exerted by the main control unit 21a, the information terminal 2 issues a registration request to the server device 1 (S1). When the server device 1 receives the registration request, the entry processing unit 11b processes the registration request (S2), and the transmission processing unit 11i transmits HTML data relating to an attribute information registration window to the user's information terminal 2 (S3).

On the user's information terminal 2, the browser unit 21b displays a window in FIG. 10 on the display unit 24 (S4). When any attribute information (in this example, the postal address) is input, the attribute information is transmitted to the server device 1 (S5). When the server device 1 receives the attribute information and others, the entry processing unit 11b processes the attribute information and others (S6). Note that, while FIG. 8 is in a simplified mode, as to the attribute information, a confirmation window as in FIG. 11 may be displayed on the screen of the information terminal 2 to prompt the user to confirm the information. The processed attribute information is recorded on the user DB 18 by the management unit 11g. Thereafter, in the server device 1, the transmission processing unit 11i successively transmits HTML data relating to a land registration window to the user's information terminal 2 (S7).

Figure 8:
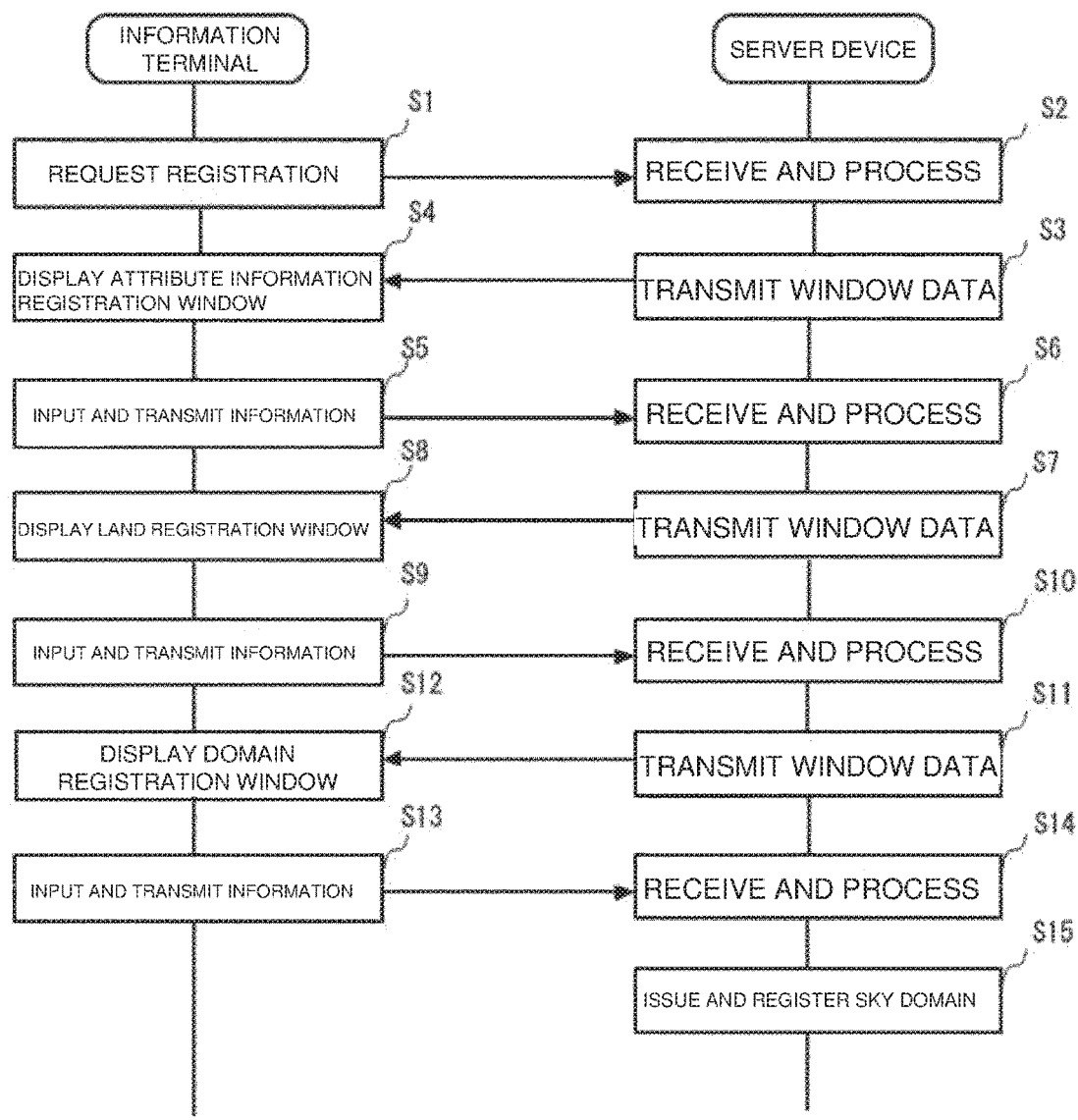
FIG. 8 is a chart of a procedure of issuing a sky domain by the system.
Figure 11:
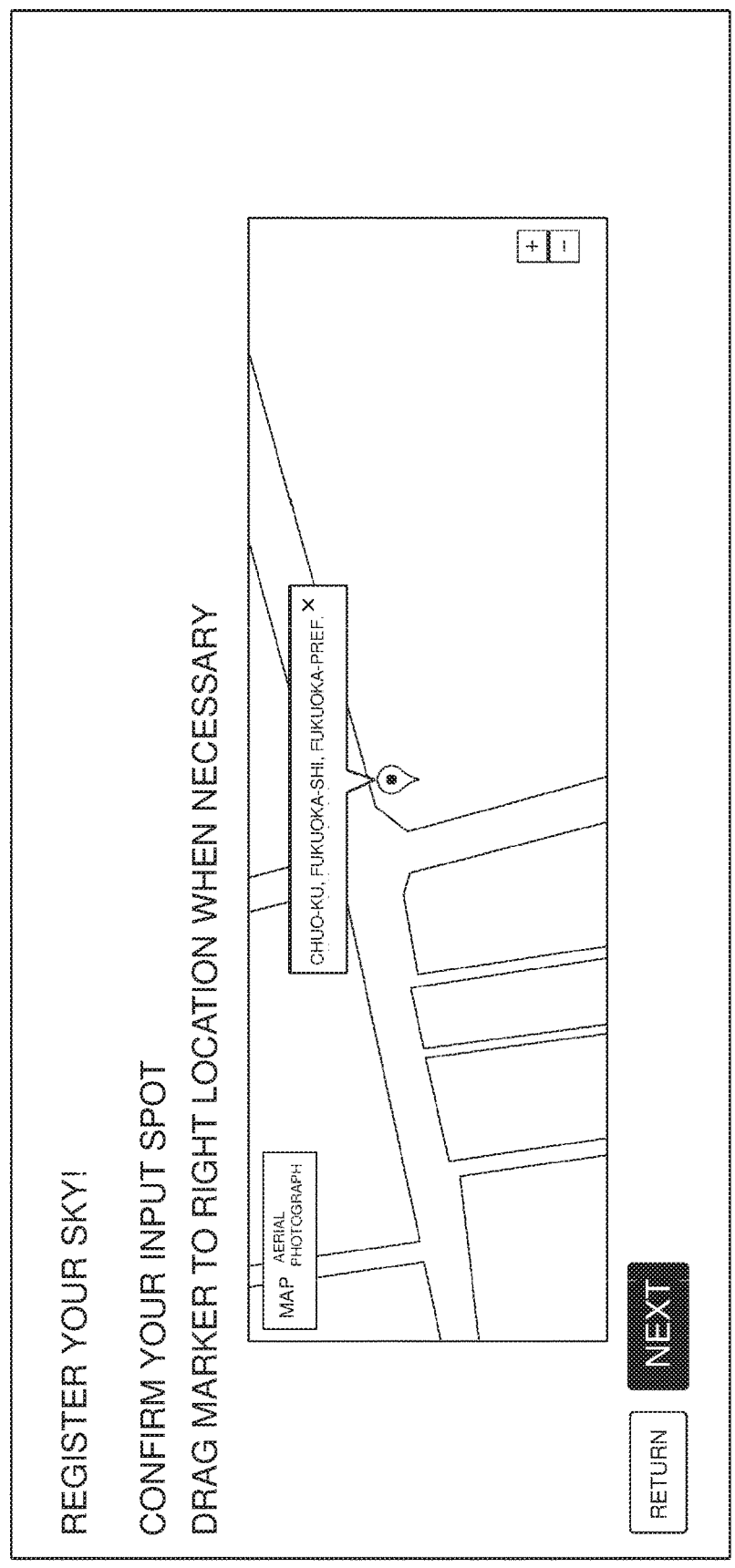
FIG. 11 illustrates a registration window.
Figure 12:
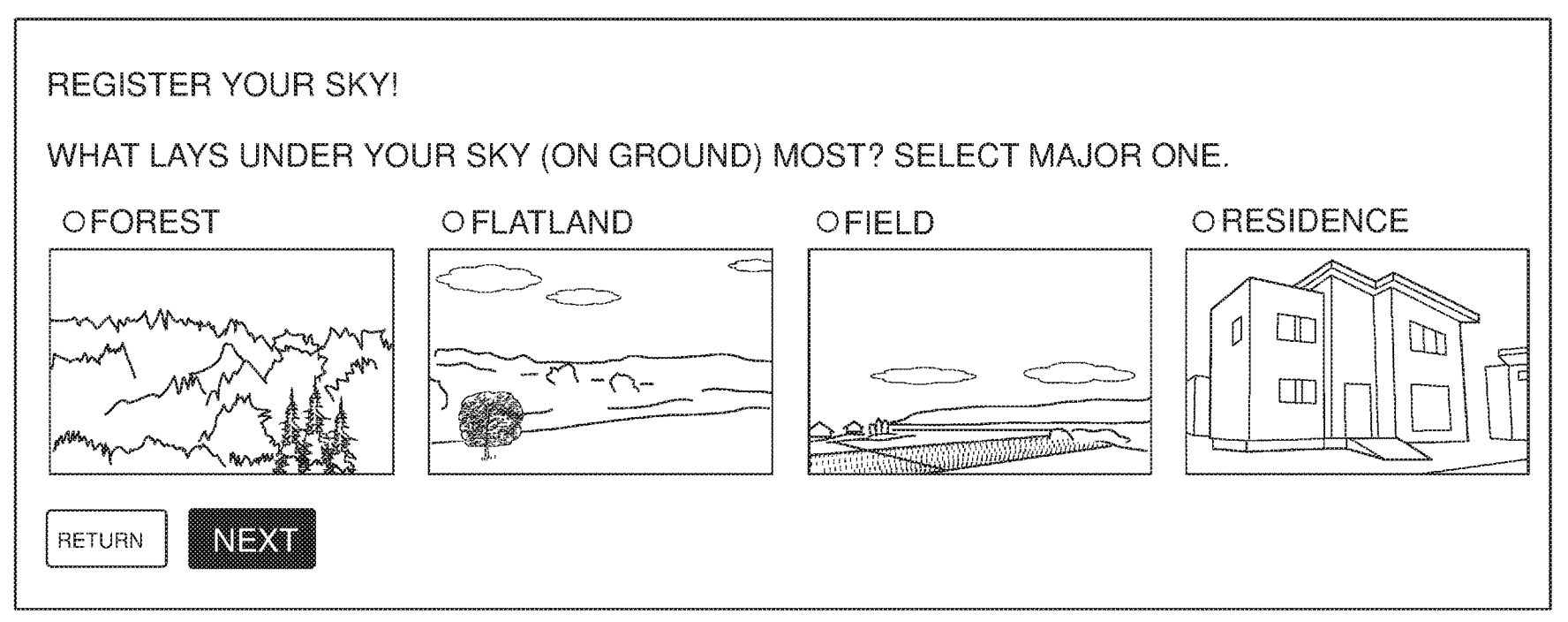
Figure 14:
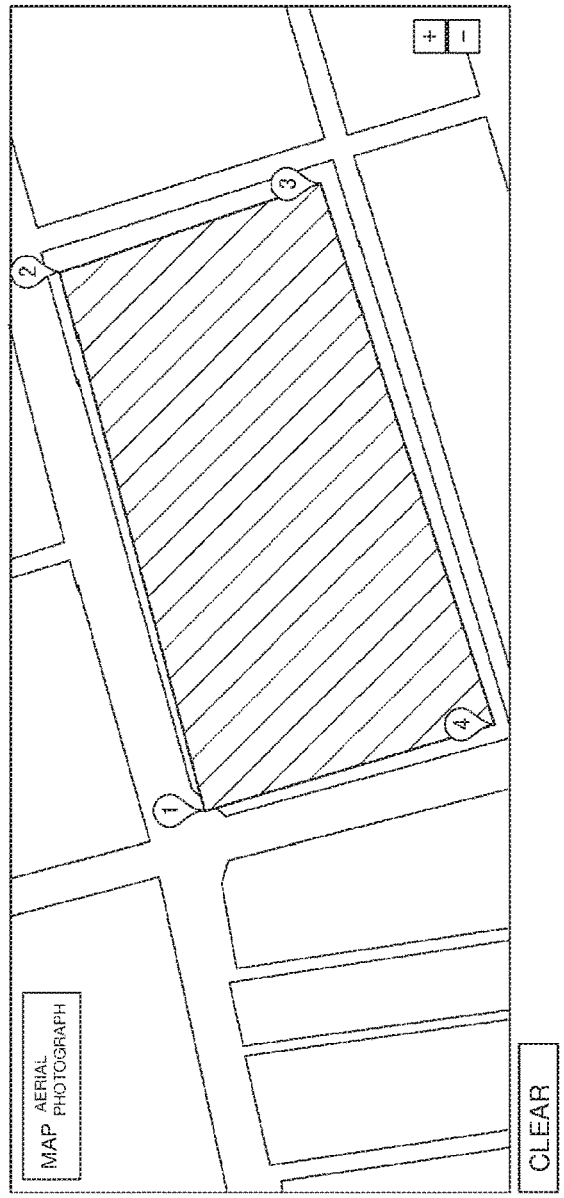
FIG. 14 illustrates a registration window.

While FIG. 8 is in a simplified mode, on the user's information terminal 2, the browser unit 21b successively displays the windows in FIGS. 12 to 14 on the display unit 24 (S8). The window in FIG. 12 prompts the user to select the land type (forest/flatland/field/residence). The window in FIG. 13 prompts the user to select the measurement of the land (in this example, greater than 300 tsubo/less than 300 tsubo). The window in FIG. 14 prompts the user to specify the airspace. When these pieces of information are successively selected or input, they are transmitted to the server device 1 (S9). In the server device 1, every time the pieces of information are successively received, the entry processing unit 11b processes them (S10). The information on the land and the airspace having undergone processing is recorded on the land DB 14 and the sky polygon DB 15 and others by the management unit 11g. Thereafter, in the server device 1, the transmission processing unit 11i transmits HTML data relating to a domain registration window to the user's information terminal 2 (S11).

Figure 15:
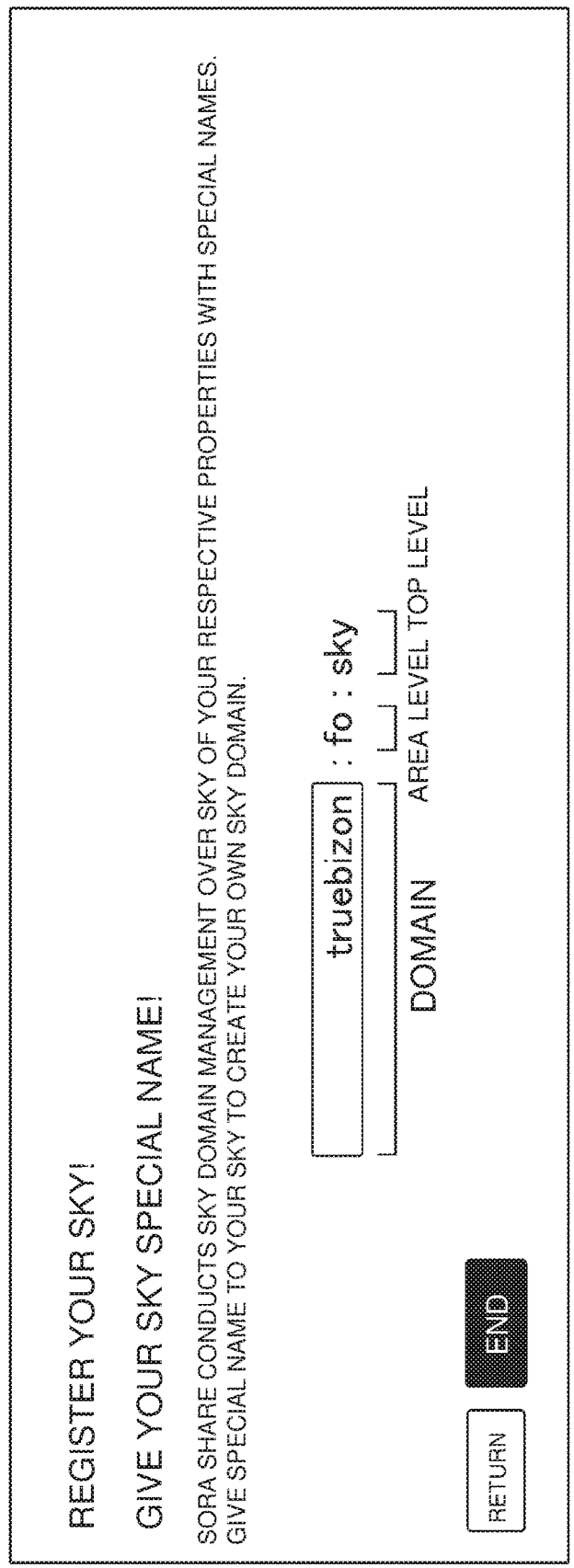
FIG. 15 illustrates a registration window.

On the user's information terminal 2, the browser unit 21b displays the window in FIG. 15 on the display unit 24 (S12), and prompts the user to input domain information. As has been described above, the applicant such as a landowner or a naming right holder can set (acquire) any third sky domain. When an input relating to the third sky domain is made, the information is transmitted to the server device 1 (S13). When the server device 1 receives the domain information, the entry processing unit 11b processes the domain information and others (S14). Thus, the domain issuance unit 11c issues a sky domain and the sky domain is recorded on the sky domain DB 16 (S15). Since this sky domain is provided with a sky domain ID, various DBs function as relational DBs using the sky domain ID as the key.

Figure 16:
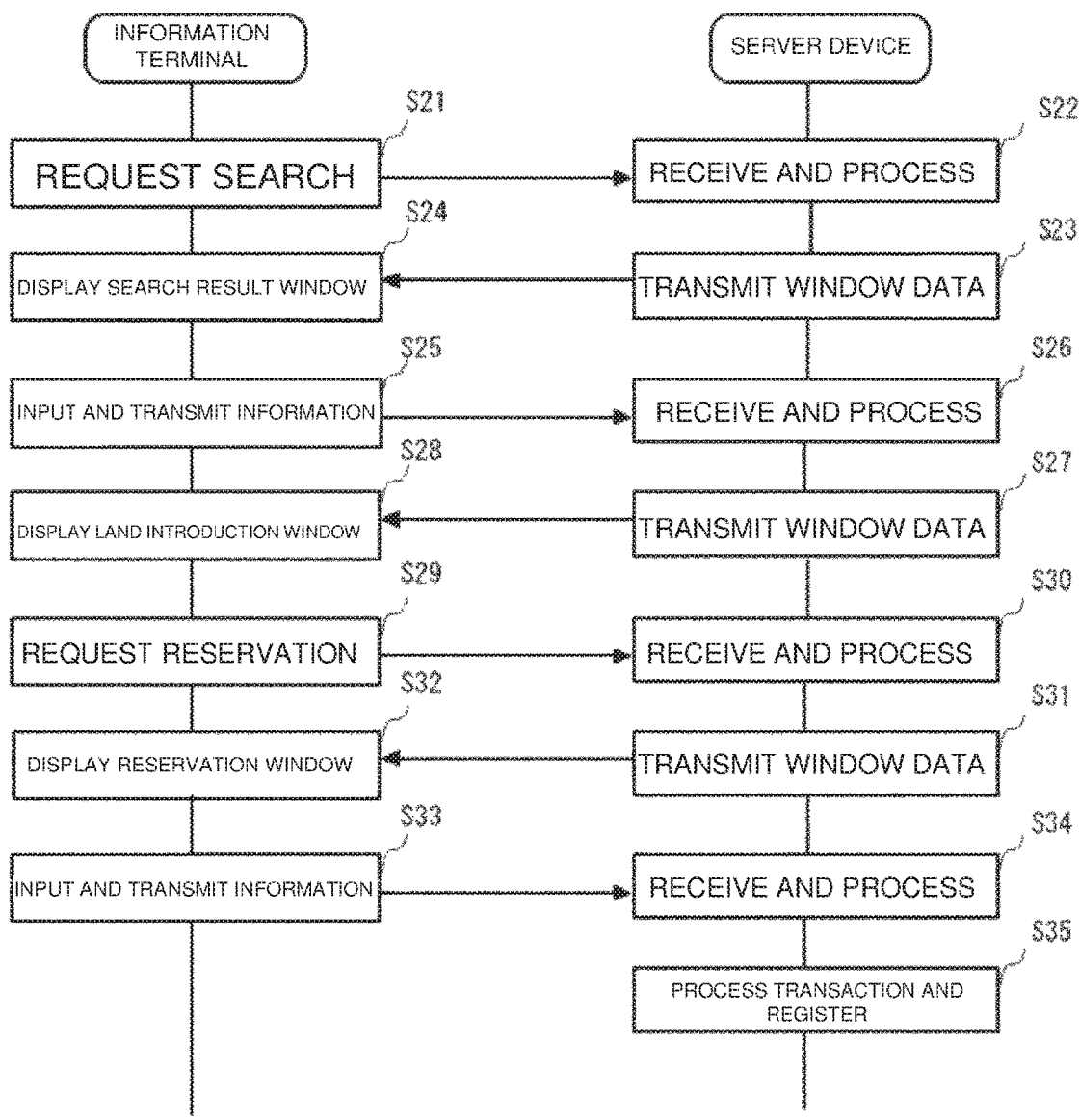
FIG. 16 is a chart of a procedure of a transaction by the airspace utilization facilitation system.

Next, with reference to the flowchart of FIG. 16, a detailed description will be given of the procedure of processing a transaction by the airspace utilization facilitation system according to one embodiment of the present invention. Here, the description thereof will be given with reference to the exemplary window displays in FIGS. 17 to 22 as appropriate.

Figure 17:
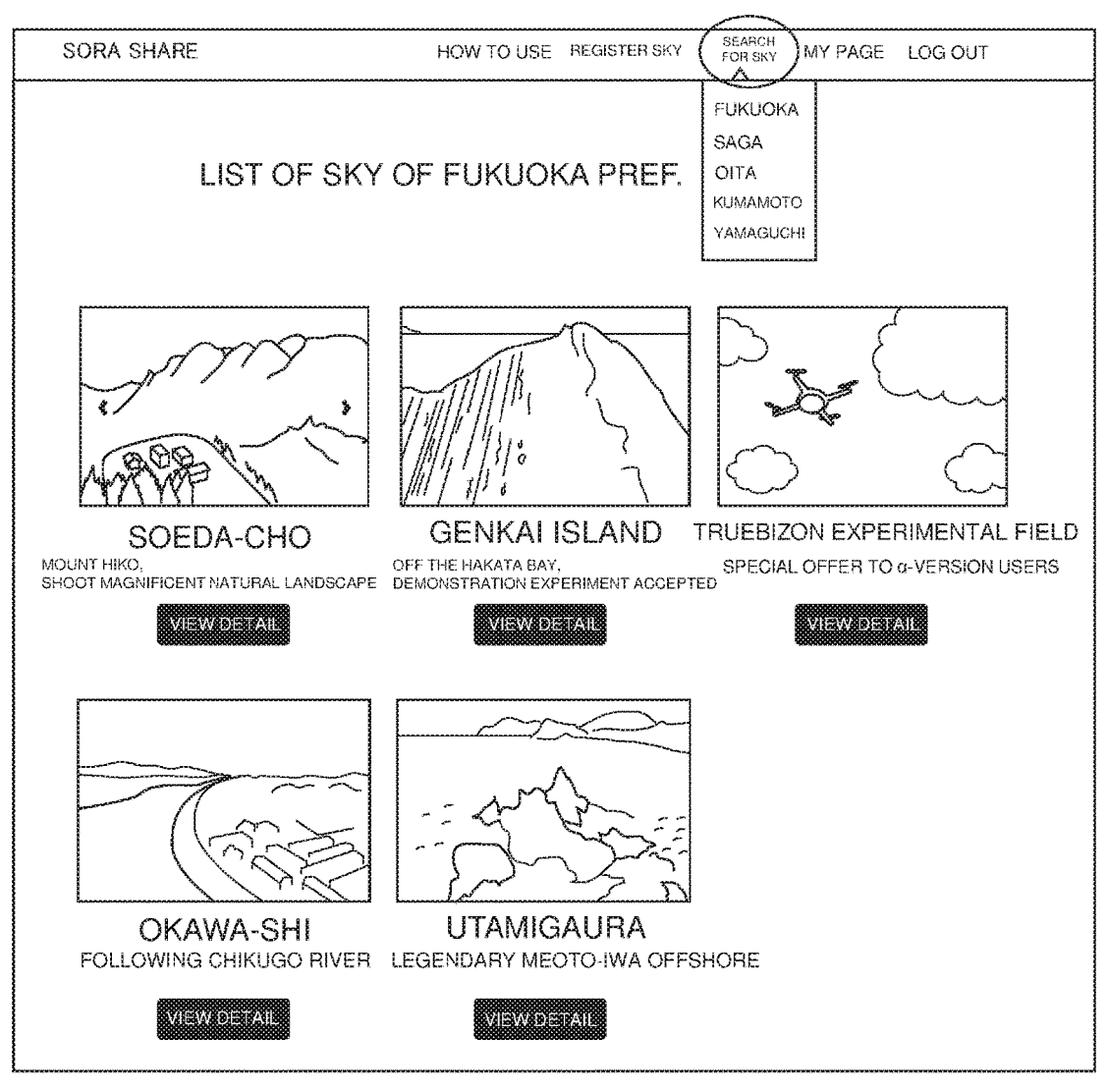

On the information terminal 3 of the user who is an airspace user or the like, when a "Search for sky" button is selected as to a desired region on the window in FIG. 17, under control exerted by the main control unit 21a, the information terminal 3 issues a search request to the server device 1 (S21). When the server device 1 receives the search request, the entry processing unit 11b processes the registration request and the search unit 11h searches through the DBs 14 to 18 (S22). Then, the transmission processing unit 11i transmits HTML data relating to a search result window to the user's information terminal 3 (S23).

Figure 18:
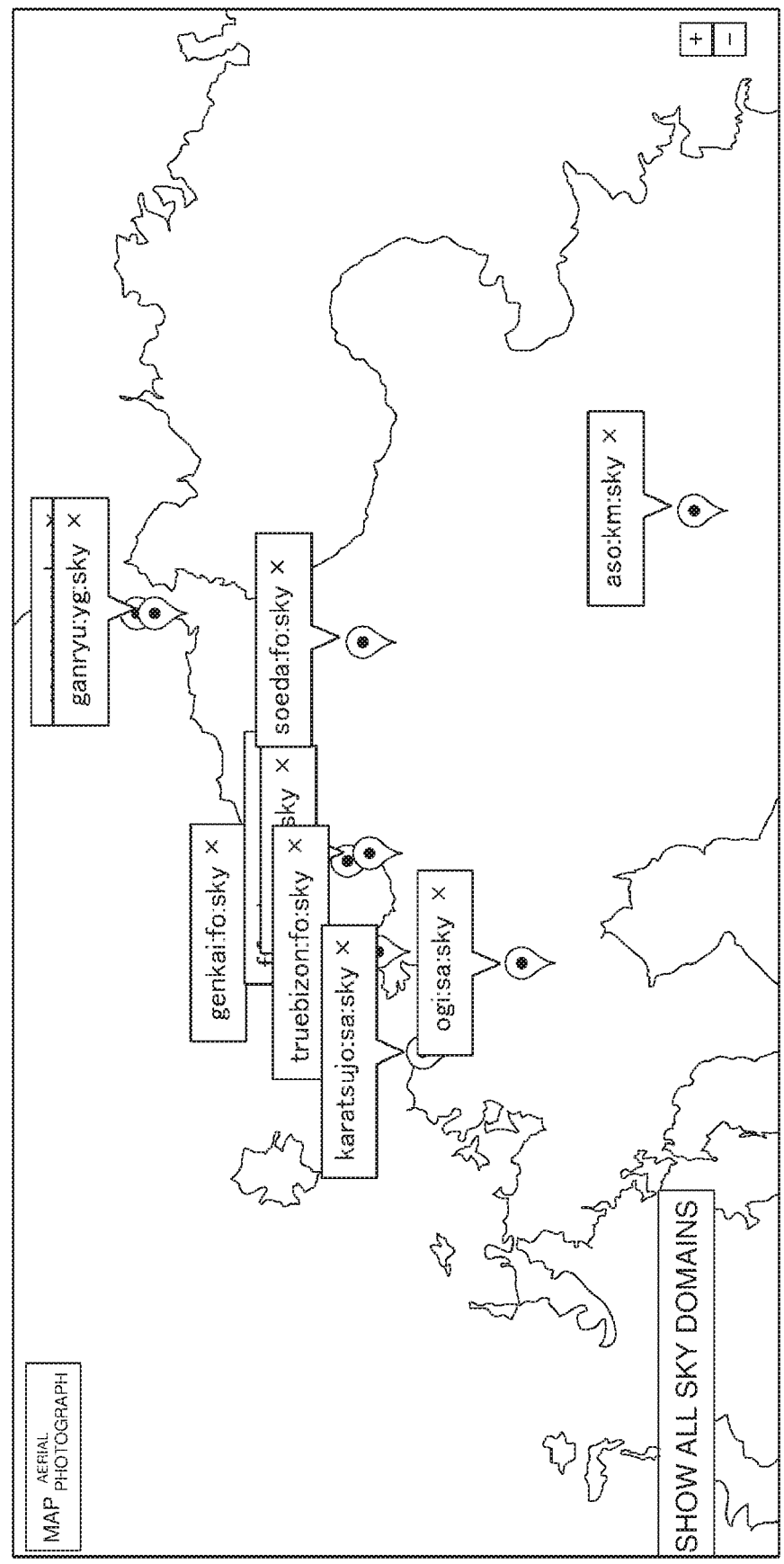
FIG. 18 illustrates a detail window.

On the user's information terminal 3, the browser unit 21b displays a window in FIG. 18 on the display unit 24 (S24). When the spot to use is selected, the information is transmitted to the server device 1 (S25). When the server device 1 receives the information relating to the spot to use, the entry processing unit 11b processes the attribute information and others (S26). Thereafter, in the server device 1, the transmission processing unit 11i successively transmits HTML data relating to a land introduction window to the user's information terminal 2 (S27).

Figure 19:
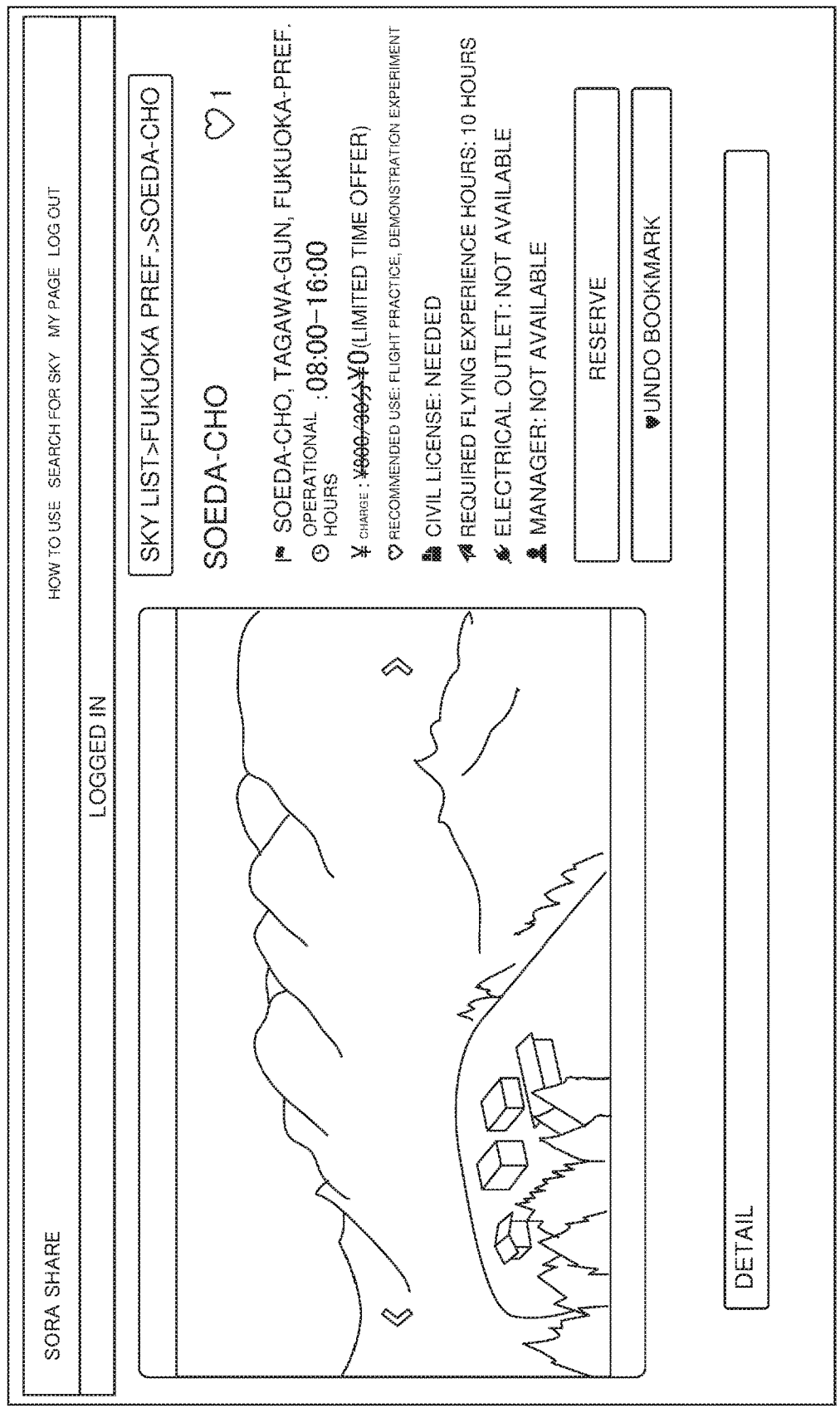
FIG. 19 illustrates a detail window.
Figure 20:
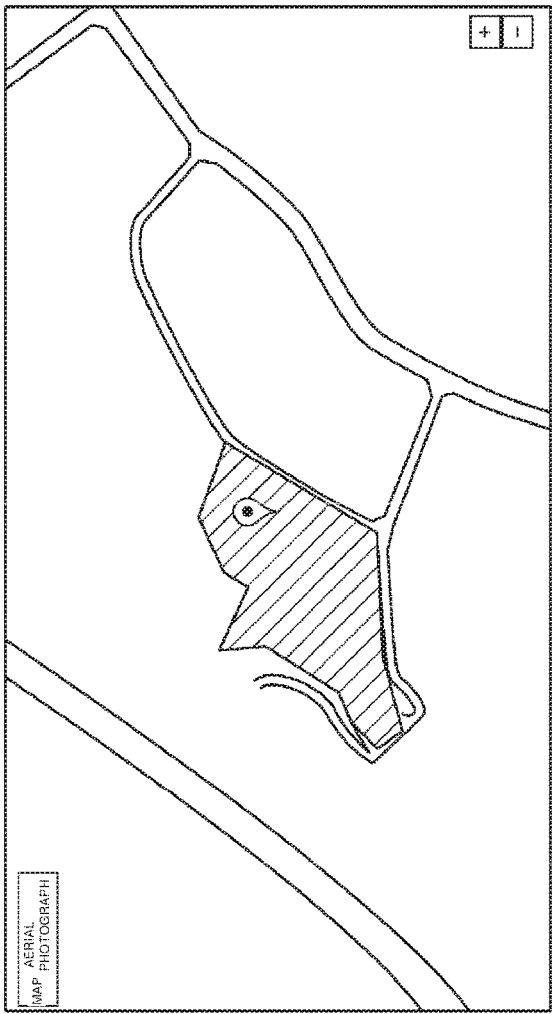
FIG. 20 illustrates a detail window.

On the user's information terminal 3, the browser unit 21b displays the window in FIG. 19 on the display unit 24 (S28). The window presents information relating to the airspace such as the postal address, the operational hours, the charge, the recommended use, and whether a license is necessary or not. Note that, when it is desired to check the airspace on a map in detail, the window can be switched to the window in FIG. 20. When a "Reserve" button is selected in the window in FIG. 19, the information is transmitted to the server device 1 (S29). When the server device 1 receives the information on the spot to use, the entry processing unit 11b processes the attribute information and others (S30). Thereafter, in the server device 1, the transmission processing unit 11i successively transmits HTML data relating to a reservation window to the user's information terminal 2 (S31).

Figure 21:
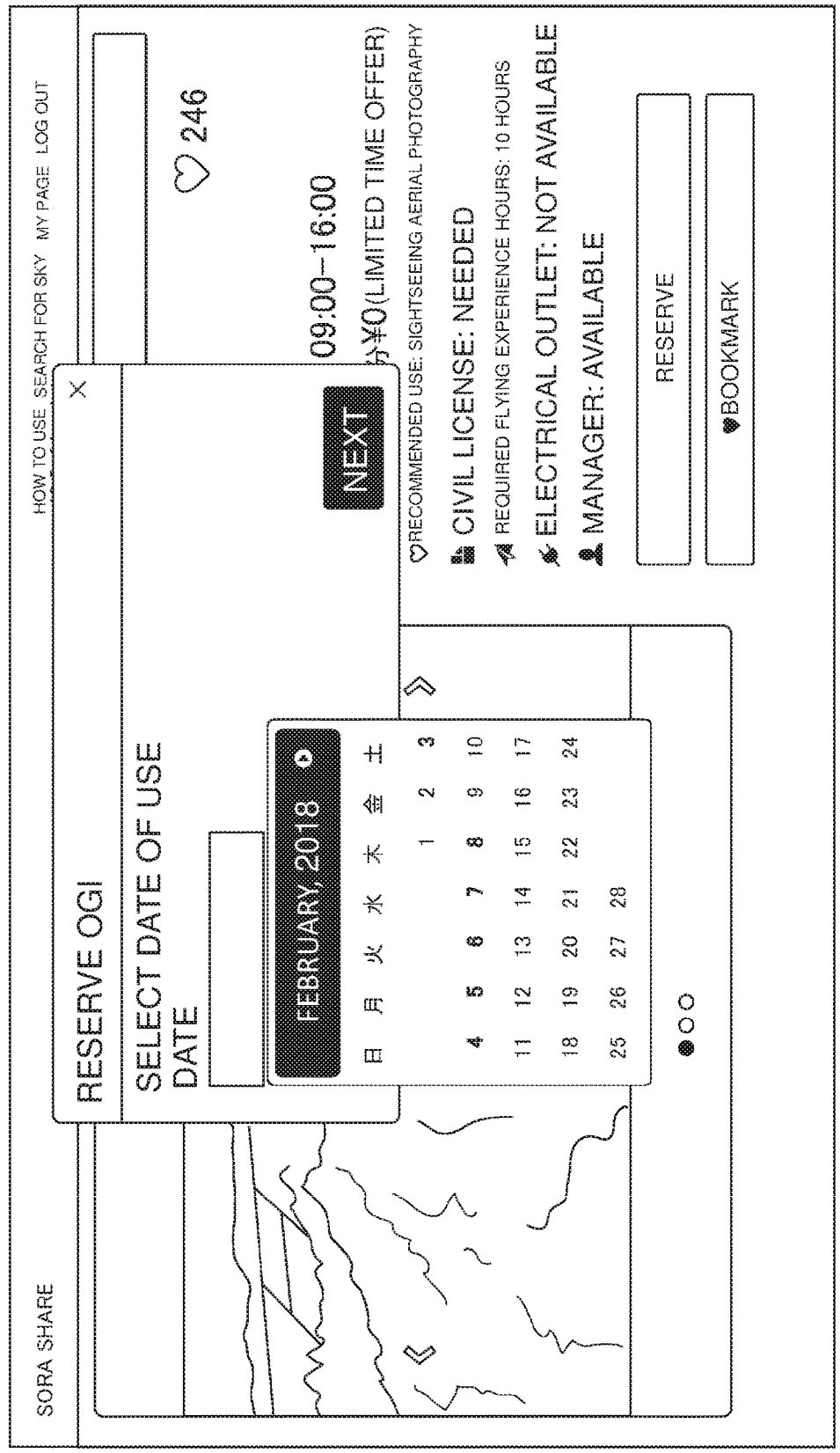
FIG. 21 illustrates a reservation window.
Figure 22:
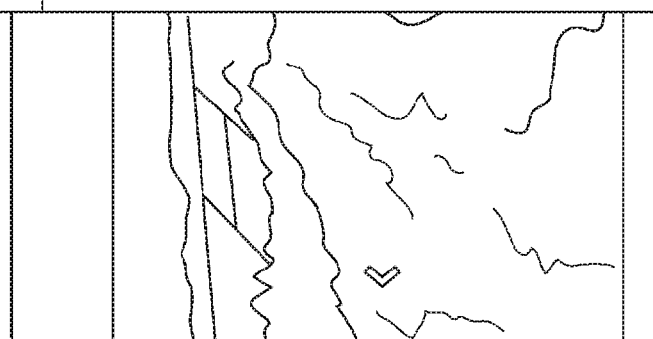
FIG. 22 illustrates a reservation window.

On the user's information terminal 3, the browser unit 21b displays a window in FIG. 21 or FIG. 22 on the display unit 24 (S32). This window allows the user to input the date to be reserved or check the availability. Then, when the user inputs the use date in FIG. 21 or FIG. 22, the reservation information is transmitted to the server device 1 (S33). When the server device 1 receives the reservation information, the entry processing unit 11b processes the reservation information (S34). Then, the management unit 11g reflects the information relating to the reservation on the DB. It goes without saying that, upon the reservation completion, HTML data relating to a reservation completion window may be transmitted to the information terminal 3 to prompt the user to confirm.

As has been described above, one embodiment of the present invention attains the following effect.

Firstly, an airspace right holder such as a landowner or his/her representative can register the airspace above the land of his/her property. In registering, a sky domain indicative of the airspace is issued to the airspace right holder. Accordingly, a plurality of airspaces can be identified and managed using the sky domains to support a great number of registrants.

Furthermore, the airspace user can use various kinds of information in searching for any airspace associated with the various kinds of information using the sky domain as the key, browse, find the desired airspace, and reserve use of the desired airspace. Here, the utilization fee or the like may be quickly paid by electronic payment. When the airspace user is planning a drone flight from a certain spot to other spot, the airspace user can check the sky domain indicative of the airspace between the spots by the search function. Thus, the user registration also is easy.

The matching the airspace registrants such as landowners and the airspace users facilitates the airspace utilization.

Furthermore, since the system previously identifies the airspaces and then prompts the user to make a user registration, the system minimizes any unauthorized flight by a non-registrant. This provides ever-more improved safety of flight.

The foregoing is the description of one embodiment of the present invention. It goes without saying that the present invention is not limited thereto and various improvements and changes may be made within a range not departing from the gist of the invention.

For example, in the case where the land property is registered in registering an airspace, if the land ownership data is open data, the server device may automatically acquire the open data. In this case, once the postal address is registered by the user or others, the airspace is automatically specified and the data thereof is recorded on the DB. In this case, in place of open data, land ownership data accumulated by the third party may be obtained on a chargeable or non-chargeable basis to perform the above-described acquisition.

Furthermore, it is also possible to record and manage the registration information, utilization information, and contract information of the sky domain by implementing the distributed ledger function on the distributed server devices or the like. The distributed ledger function may be a so-called blockchain technology.

Figure 23:
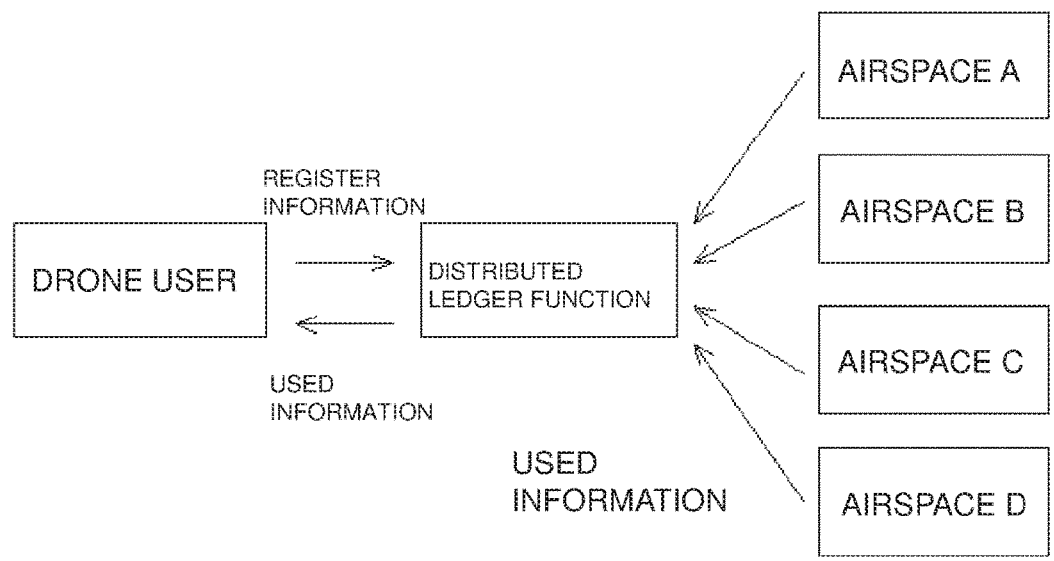
FIG. 23 illustrates management of a sky domain by a distributed ledger function.

With the blockchain, the registration information, the utilization information, and the contract information of the sky domain can be synchronously recorded and managed by computers (e.g., server devices) forming a distributed network in combination with the cryptographic technology. For example, as illustrated in FIG. 23, sky domain registration information of a drone user is uploaded on the distributed ledger function, and registration information or used information of the sky domains of airspaces A to D is uploaded on the distributed ledger function. This allows the drone user to browse the used information of the airspaces recorded and managed by the distributed ledger function as appropriate.

Figure 24:
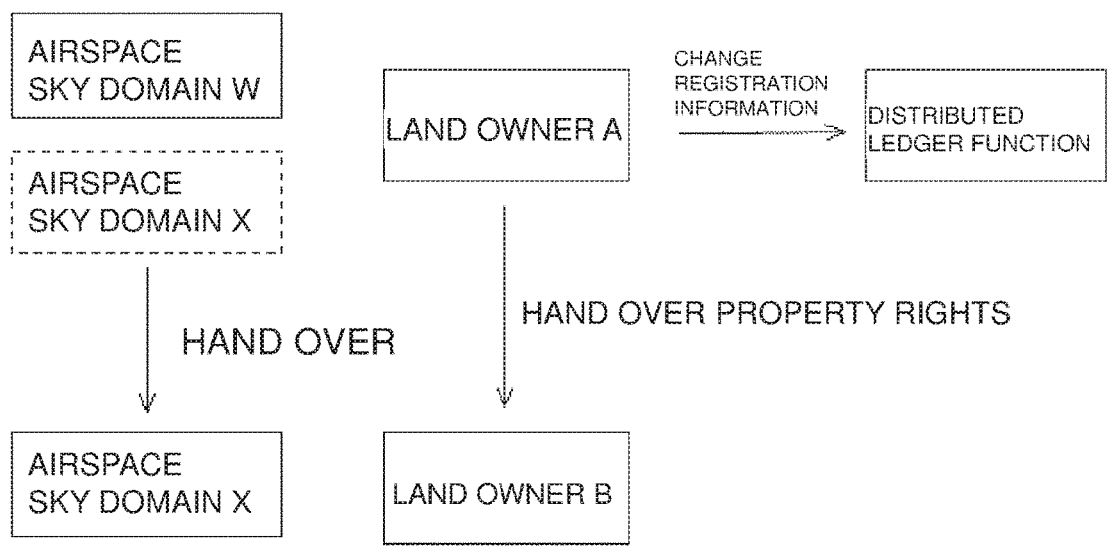
FIG. 24 illustrates management of a sky domain by a distributed ledger function.

Furthermore, as illustrated in FIG. 24, when a sky domain X relating to an airspace of a land owner A is handed over to a land owner B, the property rights is handed over from the land owner A to the land owner B. In this case, the distributed ledger function can change, record, and manage the registration information of the sky domain.

REFERENCE SIGNS LIST 1 server device
2 information terminal
3 information terminal
4 network
11 control unit
11a main control unit
11b entry processing unit
11c domain issuance unit
11d address specifying unit
11e transaction processing unit
11f settlement unit
11g management unit
11h search unit
11i transmission processing unit
12 communication unit
13 memory
14 land DB
15 sky polygon DB
16 sky domain DB
17 sub domain DB
18 user DB
21 control unit
21a main control unit
21b browser unit
22 communication unit
23 operation unit
24 display unit
25 memory

The invention claimed is:

1. A server device capable of establishing communication with a first information terminal of an airspace registrant and a second information terminal of an airspace user, and configured to issue a sky domain that specifies an airspace and is formed of at least first to third domain information, the server device comprising:
an entry processing unit configured to process a sky domain issuance request from the first information terminal;
a domain issuance unit configured to issue a sky domain in response to the issuance request;
a memory configured to store at least the sky domain, latitude, longitude, and altitude of a representative point, and operational hours;
a search unit configured to conduct a search using the sky domain as a search key with reference to the memory in response to a search request from the second information terminal, the search request relating to the airspace with which the sky domain has been issued;
a transaction processing unit configured to process a transaction relating to airspace utilization through the sky domain with reference to the memory in response to a use request from the second information terminal, the use request relating to the airspace with which the sky domain has been issued; and
a transmission processing unit configured to transmit a result of the search, wherein
the domain issuance unit issues the sky domain in which the first domain information is a top sky domain formed of a predetermined character string, the second domain information is a second sky domain formed of a character string corresponding to area information that is specified according to area information of an airspace right holder, and the third domain information is a third sky domain formed of a character string transmitted from the first information terminal,
the search unit conducts a search according to the information stored in the memory, the transmission processing unit transmits a result of the search to the second information terminal, the transaction processing unit processes a transaction according to the latitude, longitude, altitude of the representative point and the operational hours stored in the memory, and
wherein the server device matches the airspace registrant and the airspace user to facilitate use of the airspace.

2. The server device according to claim 1, wherein
the domain further includes a fourth domain information, and
a sub-domain formed of a character string transmitted from the information terminal is set as the fourth domain information.

3. The server device according to claim 1, further comprising one or more databases that store the top sky domain, the second sky domain, and the third sky domain, respectively, in a data structure or structures that relate the top sky domain, the second sky domain, and the third sky domain to one another hierarchically.

4. The server device according to claim 3, wherein the top sky domain, the second sky domain, and the third sky domain are each defined as a volume of space demarcated by a plurality of spatial coordinates, and the data structure or structures associate the pluralities of spatial coordinates with particular terrestrial areas or places.

5. The server device according to claim 4, wherein the data structure or structures associate one or more of the top sky domain, the second sky domain, and the third sky domain with the airspace registrant.

6. The server device of claim 5, wherein the one or more databases are stored, at least in part, in the memory.

7. An airspace utilization facilitation system comprising:
a first information terminal of an airspace registrant;
a second information terminal of an airspace user; and
a server device capable of establishing communication with the first information terminal and the second information terminal, and configured to issue a sky domain that specifies an airspace and is formed of at least first to third domain information, the server device including:
an entry processing unit configured to process a sky domain issuance request from the first information terminal;
a domain issuance unit configured to issue a sky domain in response to the issuance request;
a memory configured to store at least the sky domain, latitude, longitude, and altitude of a representative point, and operational hours;
a search unit configured to conduct a search using the sky domain as a search key with reference to the memory in response to a search request from the second information terminal, the search request relating to the airspace with which the sky domain has been issued;
a transaction processing unit configured to process a transaction relating to airspace utilization through the sky domain with reference to the memory in response to a use request from the second information terminal, the use request relating to the airspace with which the sky domain has been issued; and
a transmission processing unit configured to transmit a result of the search, wherein
the domain issuance unit issues the sky domain in which the first domain information is a top sky domain formed of a predetermined character string, the second domain information is a second sky domain formed of a character string corresponding to area information that is specified according to area information of an airspace right holder, and the third domain information is a third sky domain formed of a character string transmitted from the first information terminal, and
the search unit conducts a search according to the information stored in the memory, the transmission processing unit transmits a result of the search to the second information terminal, the transaction processing unit processes a transaction according to the latitude, longitude, altitude of the representative point and the operational hours stored in the memory;
wherein the server device of the system matches the airspace registrant and the airspace user to facilitate use of the airspace.

8. The airspace utilization facilitation system according to claim 7, wherein the server device records and manages registration information, utilization information, and contract information of the sky domain by a distributed ledger function.

9. An airspace utilization facilitation method performed by an airspace utilization facilitation system including a first information terminal of an airspace registrant, a second information terminal of an airspace user, and a server device capable of establishing communication with the first information terminal and the second information terminal and configured to issue a sky domain that specifies an airspace and is formed of at least first to third domain information, the method comprising:
in the server device,
processing, by an entry processing unit, a sky domain issuance request from the first information terminal;
issuing, by a domain issuance unit, a sky domain in response to the issuance request;
storing, by a memory, at least the sky domain;
conducting a search, by a search unit, using the sky domain as a search key with reference to the memory in response to a search request from the second information terminal, the search request relating to the airspace with which the sky domain has been issued;
processing, by a transaction processing unit, a transaction relating to airspace utilization through the sky domain with reference to the memory in response to a use request from the second information terminal, the use request relating to the airspace with which the sky domain has been issued; and
transmitting, by a transmission processing unit, a result of the search, wherein
the domain issuance unit issues the sky domain in which the first domain information is a top sky domain formed of a predetermined character string, the second domain information is a second sky domain formed of a character string corresponding to area information that is specified according to area information of an airspace right holder, and the third domain information is a third sky domain formed of a character string transmitted from the first information terminal, and
the search unit conducts a search according to the information stored in the memory, the transmission processing unit transmits a result of the search to the second information terminal, the transaction processing unit processes a transaction according to the latitude, longitude, altitude of the representative point and the operational hours stored in the memory;
wherein the server device of the system matches the airspace registrant and the airspace user to facilitate use of the airspace.

\* \* \* \* \*